E. A. VARY.
FRUIT PITTING MACHINE.
APPLICATION FILED MAY 29, 1911.

1,074,393.

Patented Sept. 30, 1913.

5 SHEETS—SHEET 1.

Witnesses

Inventor
Elmer A. Vary
By Mason Fenwick & Lawrence
Attorneys

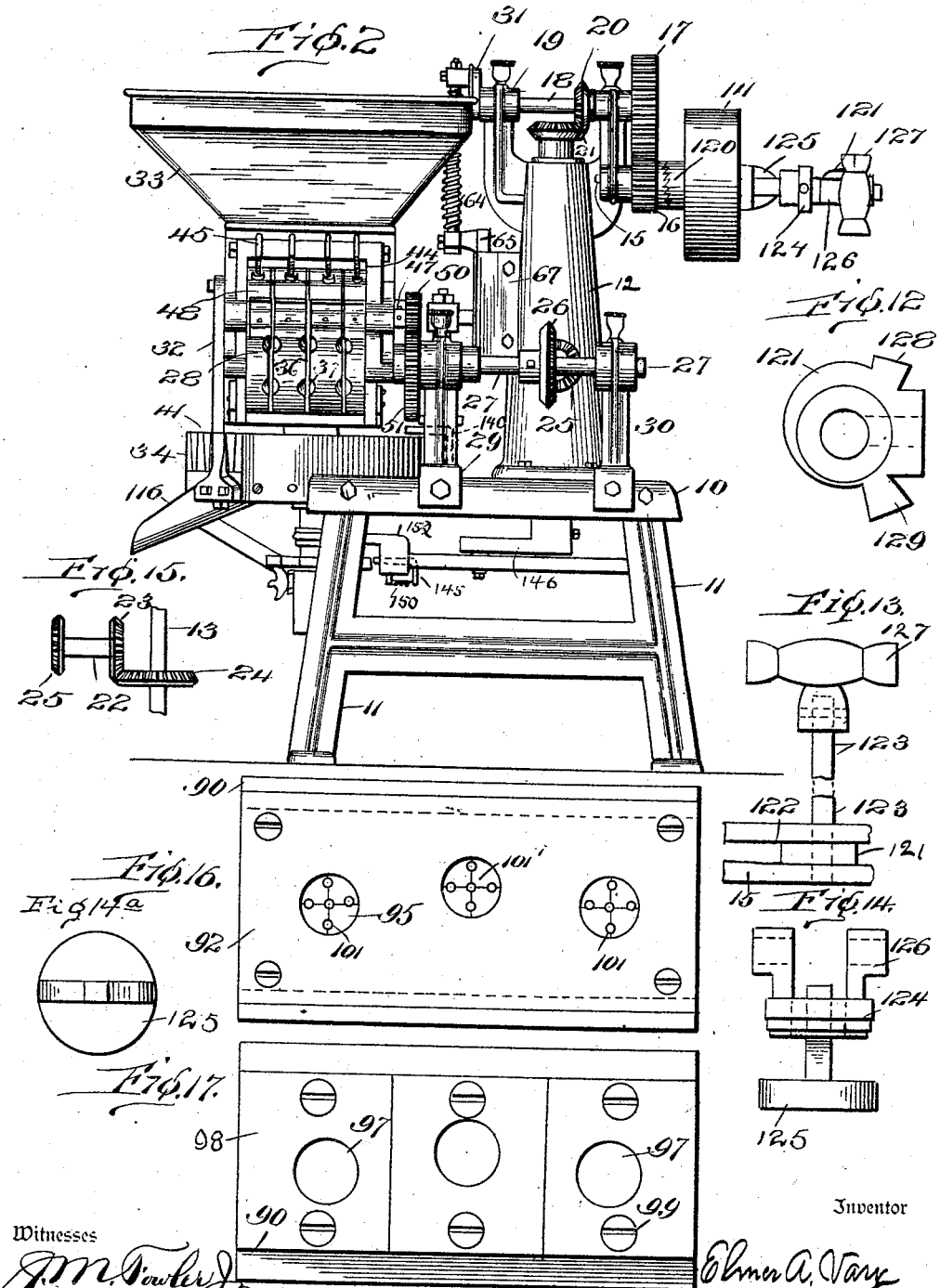

E. A. VARY.
FRUIT PITTING MACHINE.
APPLICATION FILED MAY 29, 1911.
1,074,393.
Patented Sept. 30, 1913.
5 SHEETS—SHEET 3.
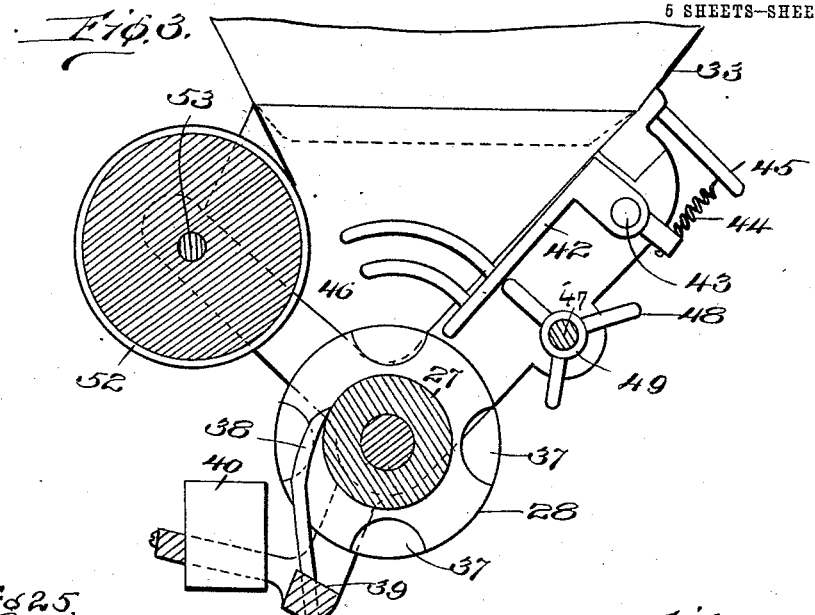
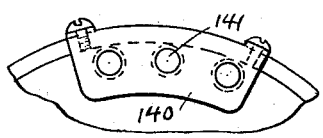
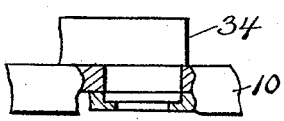
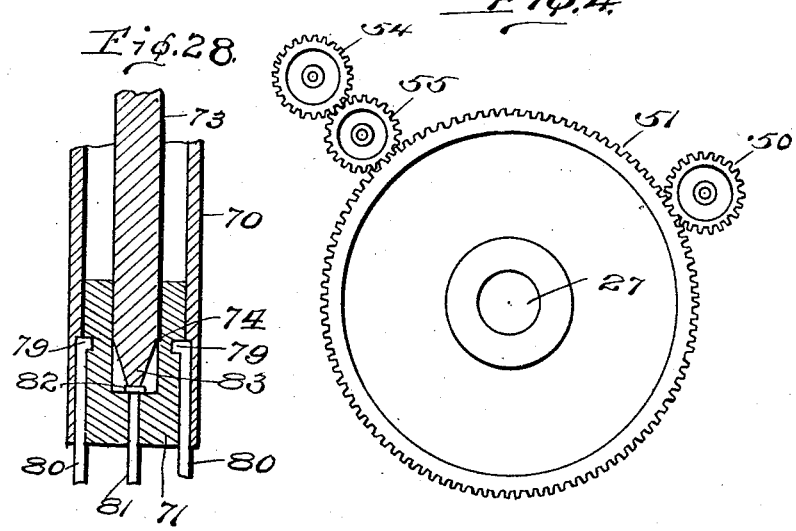
Witnesses
Inventor
Elmer A. Vary
By Mason Fenwick & Lawrence
Attorneys E. A. VARY.
FRUIT PITTING MACHINE.
APPLICATION FILED MAY 29, 1911.
1,074,393.
Patented Sept. 30, 1913.
5 SHEETS—SHEET 4.
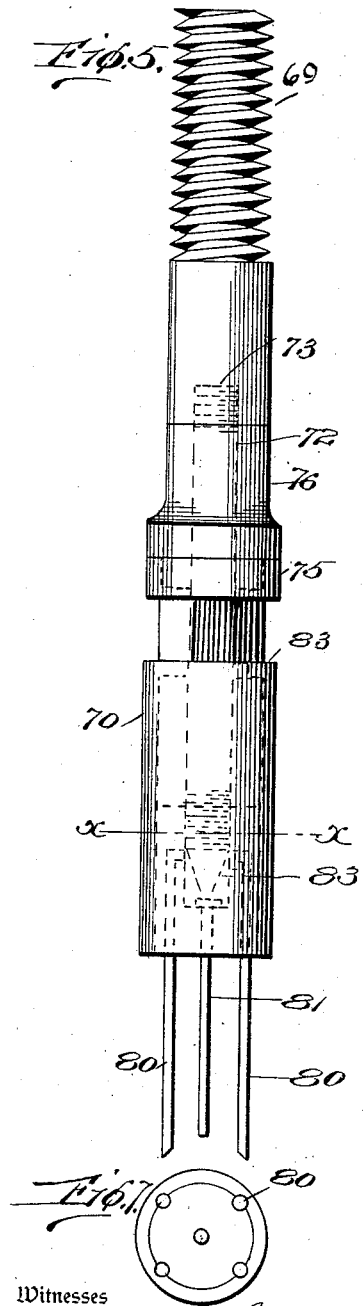
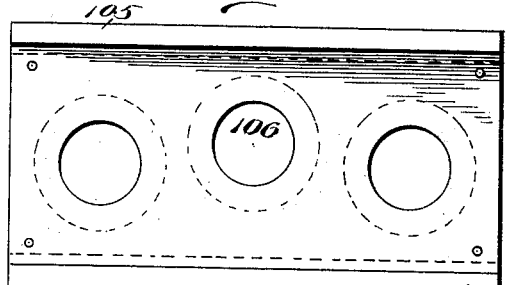
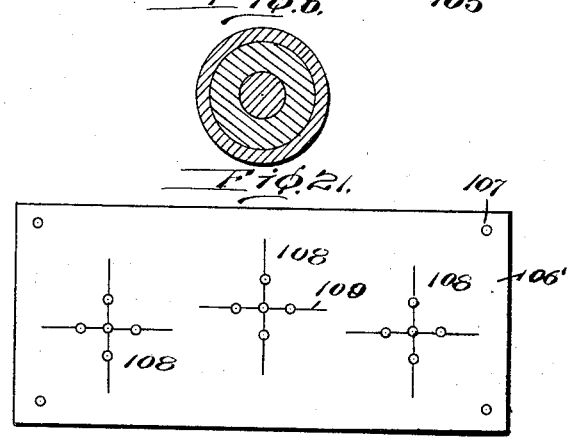
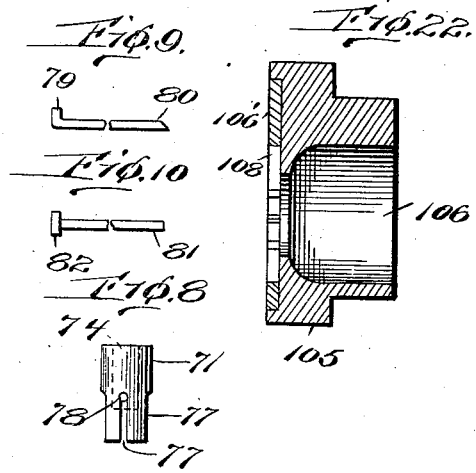
Inventor
Elmer A. Vary
By Mason Fenwick & Lawrence
Attorneys
Witnesses E. A. VARY.
FRUIT PITTING MACHINE.
APPLICATION FILED MAY 29, 1911.
1,074,393.
Patented Sept. 30, 1913.
5 SHEETS—SHEET 5.
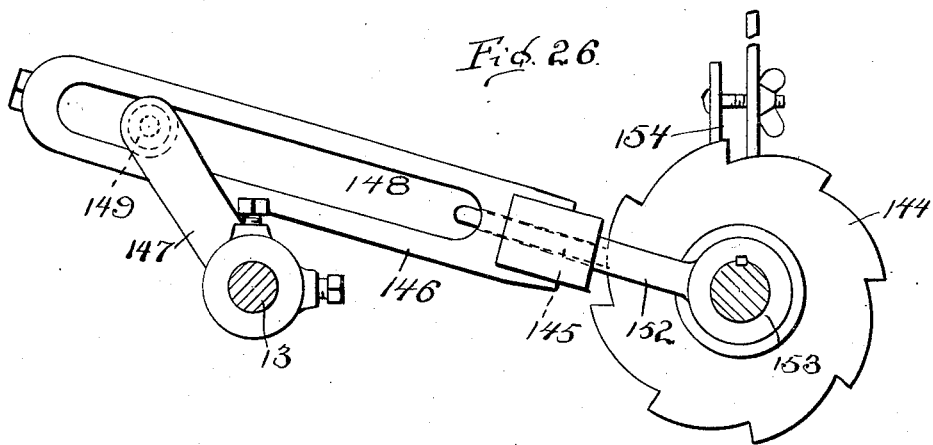
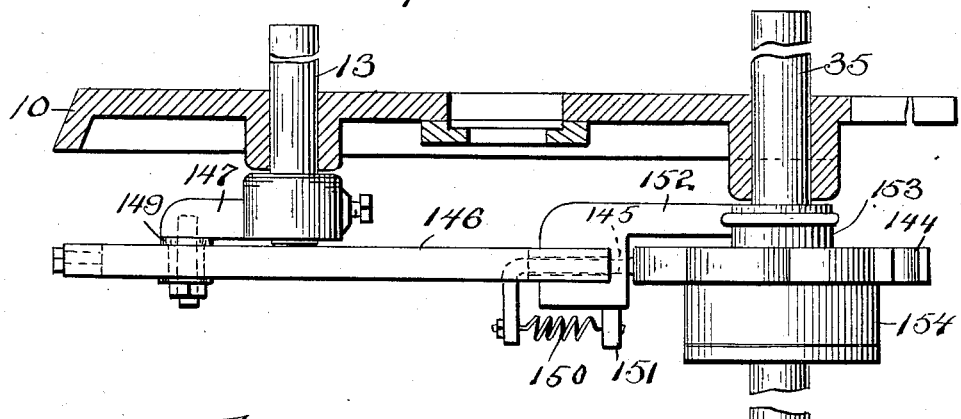
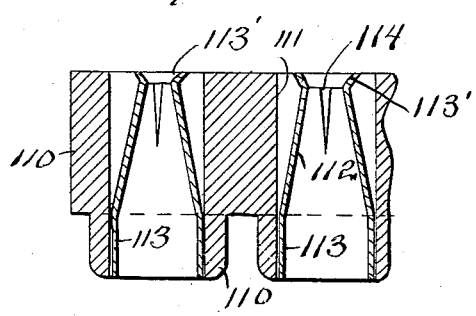
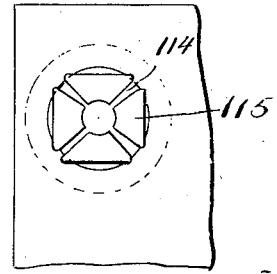
Inventor
Elmer A. Vary
By Mason Fenwick & Lawrence
Attorneys
Witnesses
J. M. Fowler Jr.
O. H. Johnson

UNITED STATES PATENT OFFICE.

ELMER A. VARY, OF MIDDLEPORT, NEW YORK.

FRUIT-PITTING MACHINE.

1,074,393.  Specification of Letters Patent.  Patented Sept. 30, 1913.

Application filed May 29, 1911. Serial No. 630,011.

*To all whom it may concern:*

Be it known that I, ELMER A. VARY, a citizen of the United States, residing at Middleport, in the county of Niagara and State of New York, have invented certain new and useful Improvements in Fruit-Pitting Machines; and I do hereby declare the following to be a full, clear, and exact description of the invention, such as will enable others skilled in the art to which it appertains to make and use the same.

This invention relates to fruit pitting machines and the object is to provide improved means for agitating the fruit and feeding the latter to the pitting mechanism proper and further to provide improved means for extracting the pits.

With these and other objects in view the invention consists in the novel construction hereinafter described and claimed.

Figure 1:
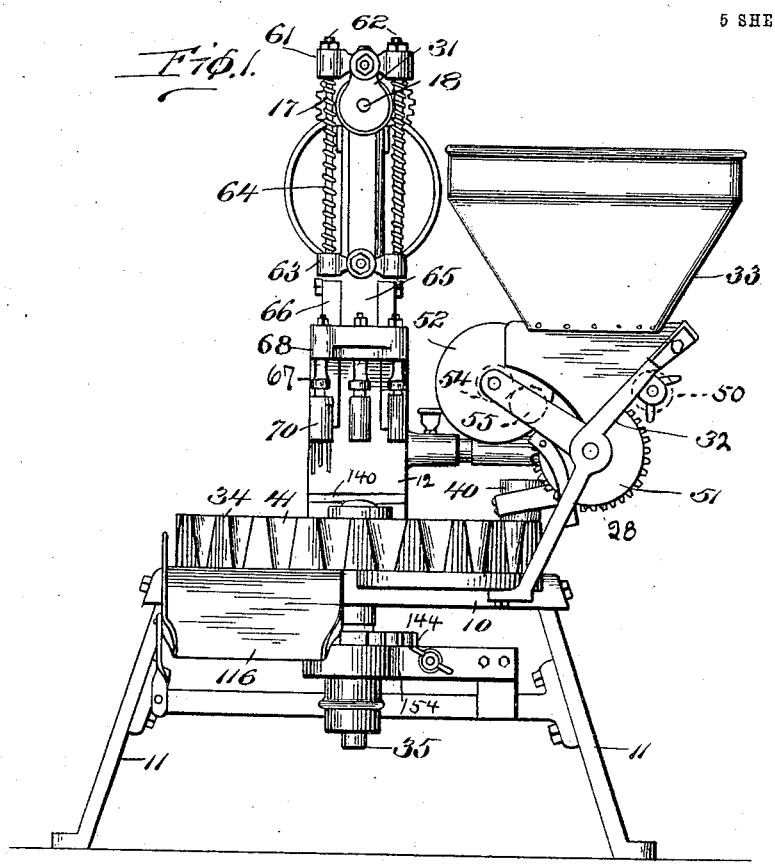
Figure 18:
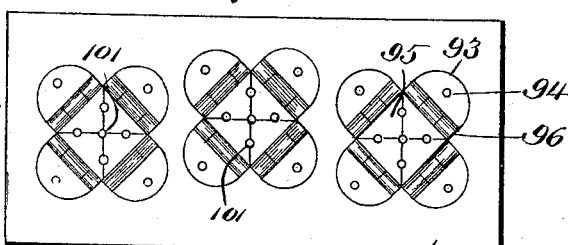
Figure 19:
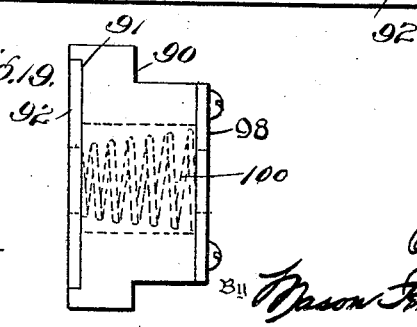

In the accompanying drawings forming a part of the application, Figure 1 is a view of the machine in side elevation; Fig. 2 is a view also in elevation, from the rear; Fig. 3 is a section through the feeding rolls with a portion of the hopper in outline and the mechanism for agitating the fruit within the hopper in elevation: Fig. 4 is a detail view showing the gearing for driving certain of the moving parts: Fig. 5 is a view in elevation of one of the pitting devices: Fig. 6 is a section of a portion of the device shown in Fig. 5 being on the line *x—x* of Fig. 5. Fig. 7 is a detail showing the arrangement of the pitting forks: Fig. 8 is a detail view showing a core arranged to be mounted in a sleeve constituting a portion of the structure shown in Fig. 5. Figs. 9 and 10 are details of the forms of the pitting device proper: Fig. 11 shows the location of the pit-receiving device in the bed of the machine: Fig. 12 is a detail of a cam for operating the clutch on the driving shaft: Fig. 13 shows a cam in the end of a slotted shaft and means for controlling the cam. Fig. 14 shows a sleeve arranged to be carried by the main shaft and provided with ears for the accommodation of the cam: Fig. 14$^a$ is a top plan view of the element shown in the lower part of Fig. 14. Fig. 15 is a detail showing the gears for driving the horizontal shaft from the vertical shaft: Fig. 16 is a plan view of the pit-receiving device: Fig. 17 is a bottom plan view of the same: Fig. 18 is a bottom plan view of the plate forming a portion of the pit-receiving device and shown in top plan in Fig. 16: Fig. 19 is an end view of the structure shown in Figs. 16, 17 and 18. Fig. 20 is a top plan view of a portion of a modified form of pit receiving device. Fig. 21 is a plan view of a sheet of rubber or other material, properly perforated, and adapted to be secured to the device shown in Fig. 20. Fig. 22 is a section of the modified form of pit receiving device shown in Figs. 20 and 21. Fig. 23 is a detail of a pit receiving device of another form. Fig. 24 is a vertical section through the body portion of the modified form last mentioned. Fig. 25 is a plan view of the fruit detaching device which projects over the circular conveyer. Fig. 26 is a plan view of the ratchet mechanism beneath the bed plate. Fig. 27 shows the ratchet mechanism in elevation. Fig. 28 is a view in vertical section of the lower portion of the structure of Fig. 5.

In carrying out my invention I provide a suitable framework having a bed plate 10 supported upon legs 11 and carrying a vertical standard 12 for the accommodation of a shaft 13 which transmits motion from the driving mechanism to the mechanism for feeding the fruit from the hopper to the circular conveyer.

The driving pulley 14 is mounted on a horizontal shaft 15 and carries a gear 16 meshing with a gear 17 mounted upon a shaft 18 supported in suitable bearings 19 carried by standard 12. The clutch is located between driving pulley 14 and a gear 16 and will be hereinafter described. Shaft 18 carries a gear 20 meshing with a gear 21 upon the vertical shaft 13 and serves to drive the latter. The shaft 13 also drives a short horizontal shaft 22 through the medium of gears 23 and 24 and shaft 22 carries a gear 25 meshing with gear 26 on a horizontal shaft 27 carrying the main feed roll 28. Shaft 27 is supported in bearings carried by standards 29 and 30. Shaft 18 carries at one end a crank 31 designed to operate the pitting forks carried by a suitable device hereinafter described.

In the framework of the machine and supported by standards 32 is a hopper 33 for receiving the fruit and discharging the latter through the operation of the feeding mechanism to the circular conveyer 34. Said conveyer 34 is mounted upon vertical shaft 35 and is driven by mechanism beneath the bed of the machine operated from the vertical shaft 13, this mechanism giving an intermittent motion to shaft 35 in order that conveyer 34 may be stopped at the proper time while the pitting forks are being operated.

In the framework the main feed roller 28 is mounted upon shaft 27 as previously indicated and this feed roller consists of a roll having several annular grooves 36 therein, concave recesses 37 being formed at intervals about the roller and having connection with grooves 36. Fingers 38 mounted at 39 in the framework project into the aforesaid grooves, and as feed roller 28 revolves the cherries or other fruit which have been received by concave portions 37 are moved from their position and caused to drop from the feeding roller into cups 40 and are thereby guided to the apertures 41 in conveyer 34.

In Fig. 3 I have shown an arrangement by means of which the fruit is constantly agitated and is caused to pass in a certain manner from the hopper to the main feed roller 28. The arm 42 is pivoted to a stationary portion of the framework at 43 and is held in a given position by means of a spring 44 secured at 45. Arm 42 carries a plurality of fingers 46 projecting into the hopper and serving to agitate the fruit in the manner described, upon the operation of the rotating device mounted upon shaft 47. The device last mentioned consists of a collar 49 carrying fingers 48 radiating in several directions and these fingers contact with a portion of arm 42 and press the latter inwardly against the tension of spring 44. The devices just mentioned are mounted in a series adjacent the main feed roller 28 and above the latter.

Shaft 47 carries a pinion 50 on one end thereof and this pinion meshes with a gear wheel 51 carried upon shaft 27. An upper feed roll 52 is mounted on a shaft 53 and is driven through the medium of pinions 54 and 55, the latter of which meshes with gear wheel 51. The upper feed roll is designed to aid in the feeding of the fruit from the hopper to the main feed roll and is also designed to prevent the fruit from emerging from the hopper except in the manner desired.

The pitting forks are operated from shaft 18 and crank 31 connected therewith, said crank being pivotally connected with cross head 61. This cross head has connected therewith a plurality of vertical rods 62 connected with the lower cross head 63 and the cross heads are normally separated by means of coil springs 64 surrounding rods 62. The lower cross head is connected with a slide 65 and the spring connection is designed to provide for the proper operation of the pitting forks and prevent injury to the latter, which would probably result were the forks rigidly mounted. Slide 65 operates in guides 66 and the latter form a part of bracket 67 mounted upon standard 12. Secured to slide 65 is a cross bar 68 in which the threaded stems 69 of the fork-holding devices are mounted. Each fork-holding device includes lower sleeve 70 arranged to receive a slotted core 71 which core holds the prongs of the fork, cores 71 being connected with stems 69 by means of a threaded bolt 72. The upper portion of this bolt 72 is connected at 73 with a portion of stem 69, and the lower threaded portion of bolt 72 is connected with the internal bore 74 of core 71. Between the upper portion 75 of sleeve 70 and the lower portion of stem 69 the collar 76 is provided.

Core 71 is provided with longitudinal slots 77 shown in Fig. 8, the slots being arranged on the outer surface of the core and extending from the bottom to approximately the central portion thereof. At the upper end of each slot is the hole 78 for receiving the right angular portion 79 of each of the fork prongs 80. These prongs when arranged in the core in the manner described will assume the position shown in Figs. 5 and 7. The central pitting device 81 is provided with a head 82 and extends from the central portion of core 71 downwardly and is held in a given position by means of the lower conical end 83 by bolt 72. The annular recess 83 having flattened sides provides for the securing of the fork holding device to the cross bar carried by slide 65, by means of a wrench.

Several forms of pit-receiving devices may be used in the machine here described. The receiving device is located in the upper portion of the bed plate in the position shown in Fig. 11. In Figs. 16 to 19 inclusive I have shown a form in which a metallic plate 90 is provided, said plate having a channeled portion 91 extending lengthwise of its upper portion and having the side walls formed in such manner that the plate as a whole will be received and held in the guides 93 forming a portion of the bed plate proper. The upper plate 92 is arranged within the channeled portion 91 and on the underside of this plate 92 a plurality of hinged devices are provided. In Fig. 18 a bottom plan view of plate 92 is shown and the hinged devices are indicated by 93. These devices consist of ears arranged to be secured to the plate 92 by pins 94, said ears having a hinged connection 96 with triangular plates 95 which plates meet in the center of the apertures provided for the reception of the forks. Such apertures are shown in Fig. 17 and are indicated by 97. Plates 98 are secured to the lower portion of plate 92 by screws 99 and retain in position springs 100 which are disposed between lower plates 98 and upper plates 92 of the holders.

Triangular plates 95 have apertures 101 in the sides thereof and these apertures register in such manner that a circular opening will be formed at the proper place for each of the prongs 80 of the fork; the central aperture 101 provides for the accommodation of central pitting member 81.

A further form of pit-receiving device is shown in Figs. 20 and 21, in which a plate 105 is provided with a channel similar to the channel in the plate previously mentioned, and the plate 105 is also provided with apertures 106 for receiving the forks. Within the channel in plate 105 a strip of rubber or other suitable material 106′ is secured by means of pins 107. The strip of rubber or other material is provided with slits 108 which intersect slits 109 at points corresponding with the center of apertures 106. The first operation of the forks will perforate the strip in the manner shown in Fig. 21, and during the subsequent operation of the forks, when pitting the fruit, the pits will depress the central portion of the strip 106′ adjacent to the point of intersection of slits 108 and 109 and the pit will therefore be extracted from the forks. In Fig. 22 a section of the pit-receiving device last mentioned is shown, the section being taken on a line substantially coincident with the slit 108 at the extreme right in Fig. 21.

A further form of pit-receiving device is shown in Figs. 23 and 24. In this form a holding device 110 is provided with apertures 111 and within these apertures metallic cone-shaped members 112 are located. These cone-shaped members are provided at their lower ends with annular flanged portions 113. An upwardly extending flange 113′ is carried by the upper portion of the cone, this flange being concave on its outer surface, and the cone and flange are provided with a plurality of slits 114 dividing the cone into spring fingers 115. It will be understood that fingers 115 are designed to act in the same manner as the resilient or spring held devices previously mentioned.

On shaft 15, carrying pulley 14, a clutch 120 is mounted, this clutch being operated by the following mechanism: A member 125 shown in Figs. 14 and 14ᵃ comprises a collar with an arched portion projecting therefrom and having a central stem connected with such portion. The collar encircles the shaft 15 and throws pulley 14 and the adjacent clutch member into operative position. The arched portion of member 125 passes through a slot 122 in shaft 15 and the stem passes through collar 124, being disposed in slot 122, and is arranged to contact with cam 121 which is also located in slot 122. Collar 124 is rigid and is provided with ears 126 having apertures therein for the accommodation of the rod 123 which projects through the cam, the shaft and the ears. The rod 123 is provided with a handle 127 and by the operation thereof the cam is caused to engage the stem of member 125 and operate the clutch. The cam carries stop members 128 and 129.

The mechanism beneath the bed plate for giving an intermittent motion to the circular conveyer is shown in Figs. 26 and 27. It is obvious that the conveyer must be stopped with the apertures 41 containing the fruit, immediately under the pitting forks, and in this connection attention should be directed to the fruit detaching device 140 which projects above the conveyer 34 and is provided with apertures 141 through which the forks pass, the detaching device or plate 140 serving to sever the fruit from the forks on their upward stroke. The apertures 41 are so formed that they will accommodate fruit of various sizes, the fruit falling into trough 116 when the apertures successively come into the position of those shown at the left in Fig. 1. Shaft 35 of the conveyer carries a ratchet wheel 144 operated through the medium of a pawl 145 mounted in arm 146, which arm is in turn operated by a crank 147 on shaft 13. The arm is slotted as at 148 and a roller 149 carried by the crank operates in the slot. The pawl comprises a right angled member operating in a bore or recess in the arm, and connected by a spring 150 with a fixed member 151. One end of arm 146 enters the enlarged portion of member 152 which has connection with a collar 153 on shaft 35. A tension band 154 surrounds collar 155 connected with the ratchet wheel, the band being provided with a leather lining.

I claim:—

1. In a fruit pitting machine, a hopper, a feeding roll provided with sockets, annular grooves intersecting the sockets, devices projecting into the grooves for freeing the fruit and means for pitting the fruit.

2. In a fruit pitting machine, a hopper, a feeding roll provided with sockets, annular grooves intersecting the sockets, devices projecting into the grooves for freeing the fruit, means for pitting the fruit and means for agitating the fruit within the hopper.

3. In a fruit pitting machine, a hopper, a plurality of spring held arms mounted adjacent thereto, fingers carried by the arms and projecting into the hopper, a fruit feeding roll, a shaft therefor, and means for operating the agitating devices from said shaft.

4. In a fruit pitting machine, a hopper, a plurality of spring held arms mounted adjacent thereto, fingers carried by the arms and projecting into the hopper, a fruit feeding roll, a shaft therefor, means for operating the agitating devices from said shaft and a second roll coöperating with the roll first mentioned and driven by the means last mentioned.

5. In a fruit pitting machine, a hopper, a framework including a bed plate, a standard carried thereby, a vertical shaft mounted within the standard, guides carried by the standard, a slide within the guides, pitting mechanism connected with the slide, a fruit feeding device, means for conveying fruit therefrom to the pitting mechanism, means for driving the feeding device from the vertical shaft and a shaft for operating the pitting mechanism and driving the vertical shaft.

6. In a fruit pitting machine, a hopper, a framework including a bed plate, a standard carried thereby, a vertical shaft mounted within the standard, guides carried by the standard, a slide within the guides, pitting mechanism connected with the slide, a fruit feeding device, means for conveying fruit therefrom to the pitting mechanism, means for driving the feeding device from the vertical shaft and a shaft for operating the pitting mechanism and driving the vertical shaft, and means for driving the conveying means from the vertical shaft.

7. In a fruit pitting machine, a pitting device comprising a stem, a sleeve supported thereby, a core provided with slots on the sides thereof and carried within the lower portion of the sleeve, means for holding the core in position, and a plurality of prongs carried by the core.

8. In a fruit pitting machine, a pitting device comprising a stem, a threaded bolt connected therewith, a sleeve carried by the stem and surrounding the bolt, a slotted core carried by the lower portion of the sleeve and held in position by the bolt, a central pitting member carried by the core, and a plurality of prongs secured within the slots of the core and projecting from the lower end of the sleeve.

9. In a fruit pitting machine, a pitting device comprising a stem having a bore in one end thereof, a bolt having threaded connection with the bore, a sleeve surrounding the lower end of the bolt, a slotted core provided with an internal bore within the lower end of the sleeve, the slots of said core being arranged on the outer sides thereof, apertures located at the ends of the slots, and prongs provided with right angled end portions disposed within the slots, said end portions engaging said apertures.

10. In a fruit pitting machine, a pitting device comprising a stem having a bore in one end thereof, a bolt having threaded connection with the bore, a sleeve surrounding the lower end of the bolt, a slotted core provided with an internal bore within the lower end of the sleeve, the slots of said core being arranged on the outer sides thereof, apertures located at the ends of the slots, prongs provided with right angled end portions disposed within the slots, said end portions engaging said apertures, and a central pitting device having one end located within the bore of the core and being held in position by the lower end of the bolt.

11. In a fruit pitting machine, a pit receiving device comprising a block, projecting members carried by the block and projecting from the edges of the apertures inwardly toward the center, said members being pivotally mounted along one edge and when in normal position constituting together a plate of rectangular formation.

12. In a fruit pitting machine, a pit receiving device comprising a block having apertures therein, and hinged members projecting from the edges of the apertures inwardly toward the center, said hinged members having notches on the edges thereof corresponding with similar notches on adjoining hinged members and providing for the accommodation of the pitting device.

13. In a fruit pitting machine, a pit receiving device comprising a block having apertures therein, and hinged members projecting from the edges of the apertures inwardly toward the center, said hinged members having notches on the edges thereof corresponding with similar notches on adjoining hinged members and providing for the accommodation of the pitting device, and a resilient device for retaining the hinged members normally in position so that their edges are adjacent.

14. In a fruit pitting machine, a pit receiving device comprising a block having a plurality of apertures arranged to register with corresponding apertures in the receiving device, and a plurality of resiliently mounted members projecting inwardly from the edges of the apertures toward the center and arranged to accommodate the pitting device, said members being pivotally mounted along one edge and when in normal position constituting together a plate of rectangular formation.

15. In a fruit pitting machine, a pit receiving device comprising a holding member provided with apertures, plates connected with the holding device adjacent to the apertures, triangular plates hinged to the plates first mentioned and projecting inwardly toward the center of the apertures, said triangular plates being provided with notches on the edges arranged to register with corresponding notches of adjoining members when the plates last mentioned are in a substantially horizontal position and close the apertures.

16. In a fruit pitting machine, a pit receiving device comprising a block having apertures therein, a plate carried by one face of the block and provided on its under side with a plurality of hinged devices projecting into the apertures and arranged to meet in the center of said apertures, a second plate carried by the lower portion of the block, and a resilient device between said plates for supporting the hinged members normally in a horizontal position.

17. In a fruit pitting machine, a pitting fork, means for operating the fork including a slidable member, rods slidably connected therewith, springs carried by the rods, a member extending transversely of the rods and connected therewith, a shaft extending at an angle with the member last mentioned, and means for operating the member by said shaft.

18. In a fruit pitting machine, a fruit conveyer, a shaft therefor and mechanism for imparting an intermittent motion to the conveyer shaft, said mechanism including a crank carried by the conveyer shaft, a slotted arm having connection with the crank, a ratchet wheel carried by the other shaft, an offset portion on the arm, said portion carrying a collar mounted on the shaft last mentioned, and a pawl carried by the arm and engaging the ratchet wheel.

In testimony whereof I affix my signature in presence of two witnesses.

ELMER A. VARY.

Witnesses:
Mrs. J. S. VARY,
M. D. BENSON.

---

Copies of this patent may be obtained for five cents each, by addressing the "Commissioner of Patents, Washington, D. C."